United States Patent
Gao et al.

(10) Patent No.: US 10,516,494 B2
(45) Date of Patent: Dec. 24, 2019

(54) METHOD AND TERMINAL FOR DETERMINING EQUIVALENT RECEIVED POWER OF CELL ACCORDING TO PRECODING MATRIX

(71) Applicant: CHINA ACADEMY OF TELECOMMUNICATIONS TECHNOLOGY, Beijing (CN)

(72) Inventors: Qiubin Gao, Beijing (CN); Runhua Chen, Beijing (CN); Wenhong Chen, Beijing (CN); Hui Li, Beijing (CN); Rakesh Tamrakar, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 155 days.

(21) Appl. No.: 15/539,981

(22) PCT Filed: Dec. 9, 2015

(86) PCT No.: PCT/CN2015/096810
§ 371 (c)(1),
(2) Date: Jun. 26, 2017

(87) PCT Pub. No.: WO2016/119526
PCT Pub. Date: Aug. 4, 2016

(65) Prior Publication Data
US 2017/0373772 A1 Dec. 28, 2017

(30) Foreign Application Priority Data
Jan. 30, 2015 (CN) .......................... 2015 1 0051428

(51) Int. Cl.
*H04L 25/03* (2006.01)
*H04B 17/318* (2015.01)
(Continued)

(52) U.S. Cl.
CPC ......... *H04B 17/318* (2015.01); *H04B 7/0452* (2013.01); *H04B 7/0456* (2013.01);
(Continued)

(58) Field of Classification Search
CPC ............. H04L 25/03898; H04L 5/0048; H04L 25/024; H04L 25/0202; H04W 52/325; H04W 52/00; H04B 7/0456
See application file for complete search history.

(56) References Cited

U.S. PATENT DOCUMENTS

2013/0058296 A1* 3/2013 Jitsukawa ......... H04W 72/0426
370/329
2013/0196664 A1 8/2013 Yiu et al.
(Continued)

FOREIGN PATENT DOCUMENTS

CN 101764681 A 6/2010
CN 103078703 A 5/2013
(Continued)

OTHER PUBLICATIONS

R1-122841, "Definition of Measurement for CoMP Resource Management", May 21-30, 2012 (Year: 2012).*
(Continued)

*Primary Examiner* — Salvador E Rivas
(74) *Attorney, Agent, or Firm* — Ladas & Parry, LLP

(57) ABSTRACT

The present disclosure provides a cell measurement method and a terminal. The cell measurement method includes steps of: measuring a pilot signal from a to-be-measured cell, so as to acquire an channel estimation of N pilot signal transmission ports of the to-be-measured cell, N≥1; determining an equivalent received power corresponding to each precoding matrix in accordance with each precoding matrix in a set of precoding matrices and the channel estimation of the N pilot signal transmission ports of the to-be-measured cell;
(Continued)

and determining an equivalent received power of the to-be-measured cell in accordance with the equivalent received power corresponding to each precoding matrix.

15 Claims, 6 Drawing Sheets

(51) Int. Cl.
*H04W 52/00* (2009.01)
*H04B 7/0456* (2017.01)
*H04B 7/0452* (2017.01)
*H04L 25/02* (2006.01)

(52) U.S. Cl.
CPC .... *H04L 25/0224* (2013.01); *H04L 25/03898* (2013.01); *H04W 52/00* (2013.01); *H04L 25/0202* (2013.01); *H04L 25/024* (2013.01); *Y02D 70/00* (2018.01)

(56) References Cited

U.S. PATENT DOCUMENTS

2013/0308714 A1* 11/2013 Xu ..................... H04B 7/0417
 375/267
2015/0085692 A1 3/2015 Wang et al.

FOREIGN PATENT DOCUMENTS

| CN | 103582043 | A | 2/2014 |
| EP | 2858402 | | 4/2015 |
| WO | 2008152612 | A2 | 12/2008 |
| WO | 2013/181783 | A1 | 12/2013 |
| WO | 2014/157867 | A1 | 10/2014 |

OTHER PUBLICATIONS

International Search Report for PCT/CN2015/096810, dated Mar. 1, 2016, and its English translation provided by WIPO.
Written Opinion of the International Search Authority for PCT/CN2015/096810, dated Mar. 1, 2016, and its English translation provided by Bing.Com Microsoft Translate.
International Preliminary Report on Patentability (IPRP; Ch. 1) for PCT/CN2015/096810, dated Aug. 10, 2017, and its English translation provided by WIPO.
Written Opinion of the International Search Authority for PCT/CN2015/096810, dated Mar. 1, 2016, and its English translation provided by WIPO.
From EPO Application No. 15879724.1, Supplementary European Search Report and Search Opinion dated Dec. 22, 2017.
From TW Application No. 104143770, Office Action dated Oct. 19, 2016 with machine English translation from Google.

* cited by examiner

--Prior Art---

--Prior Art---

--Prior Art---

--Prior Art---

--Prior Art---

US 10,516,494 B2

METHOD AND TERMINAL FOR DETERMINING EQUIVALENT RECEIVED POWER OF CELL ACCORDING TO PRECODING MATRIX

CROSS-REFERENCE TO RELATED APPLICATIONS

The present application is the U.S. national phase of PCT Application No. PCT/CN2015/096810 filed on Dec. 9, 2015, which claims a priority to the Chinese patent application No. 201510051428.3 filed on Jan. 30, 2015, the disclosures of which are incorporated herein by reference in their entireties.

TECHNICAL FIELD

The present disclosure relates to the field of wireless communication technology, in particular to a cell measurement method and a terminal.

BACKGROUND

For a Long Term Evolution (LTE) system, a cell search procedure is shown in FIG. 1, where a terminal at first searches for a Primary Synchronization Signal (PSS) (see Step 101) and acquires a timing synchronization period of 5 ms in accordance with the PSS, and then searches for a Secondary Synchronization Signal (SSS) (see Step 102) and achieve frame synchronization and acquire a cell identity (ID) in accordance with the SSS. Based on the above synchronization procedures, the terminal may acquire a Cell-Specific Reference Signal (CRS) (see Step 103), which is a common reference signal and may be used for channel estimation and demodulation as well as for cell measurement.

In the case that the terminal accesses to a cell, as a feasible method, the terminal may search for the cell as shown in FIG. 1 among a plurality of candidate target cells, measure Reference Signal Received Power (RSRP) of the CRS of each candidate target cell, and select and access to the cell with the optimal RSRP.

In a cellular system in the related art, antennae in an antenna array of a base station are usually arranged horizontally, and a beam from a transmitter of the base station may merely be adjusted in a horizontal direction, with a fixed down-tilt angle in a vertical direction. Along with the development of the antenna technology, an active antenna, each element of which is capable of being controlled independently, has been presented in the industry. Through this design, the antennae of the antenna array may be arranged in a three-dimensional (3D) manner, i.e., both horizontally and vertically, rather than in a two-dimensional (2D) manner, i.e., merely horizontally. Due to this kind of antenna array, it is possible to dynamically adjust the beams in the vertical direction. One important feature of a 3D Multiple Input Multiple Output (MIMO) lies in that there are a large number of antennae (e.g., 8, 16, 32 or 64 antennae) at a base station side and these antennae are arranged in a 2D manner, as shown in FIGS. 2a to 2d.

Along with the development of the based station antenna technology, especially the occurrence of the antennae arranged in the 3D manner (i.e., both horizontally and vertically), it is necessary to provide a corresponding cell measurement method, so as to achieve the cell measurement and acquire a more accurate cell measurement result, thereby to enable the terminal to select and access to an appropriate cell.

SUMMARY

An object of the present disclosure is to provide a cell measurement method and a terminal, so as to achieve the cell measurement.

In one aspect, the present disclosure provides in some embodiments a cell measurement method, including steps of: measuring a pilot signal from a to-be-measured cell, so as to acquire an channel estimation of N pilot signal transmission ports of the to-be-measured cell, $N \geq 1$; determining an equivalent received power corresponding to each precoding matrix in accordance with each precoding matrix in a set of precoding matrices and the channel estimation of the N pilot signal transmission ports of the to-be-measured cell; and determining an equivalent received power of the to-be-measured cell in accordance with the equivalent received power corresponding to each precoding matrix.

In another aspect, the present disclosure provides in some embodiments a terminal, including: a measurement module configured to measure a pilot signal from a to-be-measured cell, so as to acquire a channel estimation of N pilot signal transmission ports of the to-be-measured cell, $N \geq 1$; a first determination module configured to determine an equivalent received power corresponding to each precoding matrix in accordance with each precoding matrix in a set of precoding matrices and the channel estimation of the N pilot signal transmission ports of the to-be-measured cell; and a second determination module configured to determine an equivalent received power of the to-be-measured cell in accordance with the equivalent received power corresponding to each precoding matrix.

In yet another aspect, the present disclosure provides in some embodiments a terminal, including a processor, a memory and a transceiver. The processor is configured to read a program stored in the memory, so as to: measure a pilot signal from a to-be-measured cell, so as to acquire a channel estimation of N pilot signal transmission ports of the to-be-measured cell, $N \geq 1$; determine an equivalent received power corresponding to each precoding matrix in accordance with each precoding matrix in a set of precoding matrices and the channel estimation of the N pilot signal transmission ports of the to-be-measured cell; and determine an equivalent received power of the to-be-measured cell in accordance with the equivalent received power corresponding to each precoding matrix. The transceiver is configured to receive and transmit data. The processor takes charge of managing bus architecture and general processings, and the memory is configured to store data for the operation of the processor.

According to the embodiments of the present disclosure, the terminal may determine the equivalent received power corresponding to each precoding matrix in accordance with each precoding matrix in the set of precoding matrices and the channel estimation of the pilot signal transmission ports of the to-be-measured cell, and determine the equivalent received power of the to-be-measured cell in accordance with the equivalent received power corresponding to each precoding matrix, so as to determine the equivalent received power of the to-be-measured cell on the basis of the precoding matrix. The set of the precoding matrices may be set flexibly, so it is able to, based on the feature of the precoding matrix, acquire the equivalent received power of the cell in a more accurate manner, thereby to enable the terminal to select and access to an appropriate cell in the case of cell selection or reselection on the basis of the equivalent received power of the cell.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

A portion of the embodiments of the present disclosure will be described hereinafter, so as to facilitate the understanding of the present disclosure, rather than to define critical or decisive elements of the present disclosure or define the scope of the present disclosure. On the basis of the technical solutions in the present disclosure, any other implementations may be acquired through substitutions, without departing from the spirit of the present disclosure.

According to the embodiments of the present disclosure, a terminal may perform channel estimation in accordance with a pilot signal from each to-be-measured cell, and calculate an equivalent received power with respect to each to-be-measured cell in accordance with a channel estimation result and each precoding matrix in a set of precoding matrices, so as to acquire the equivalent received power of each to-be-measured cell as a basis for selecting a target handover cell or a resident cell.

Figure 1:
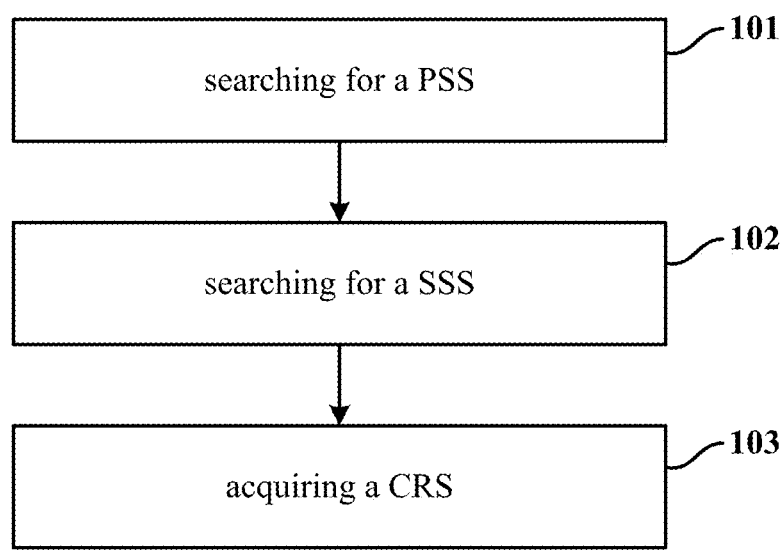
FIG. 1 is a schematic view showing a cell searching procedure in the related art.
Figure 2A:
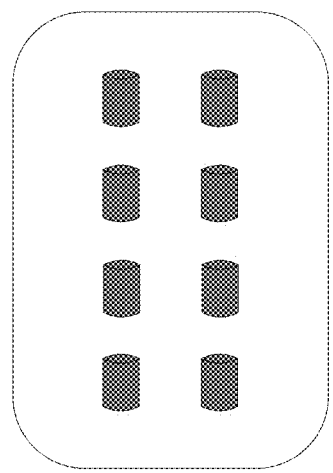
FIGS. 2a-2d are schematic views showing a 2D antenna array in a 3D MIMO system.
Figure 2B:
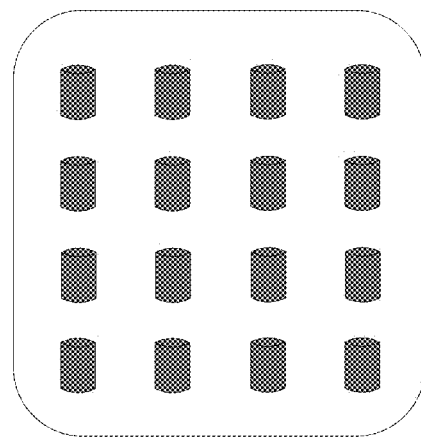
Figure 2C:
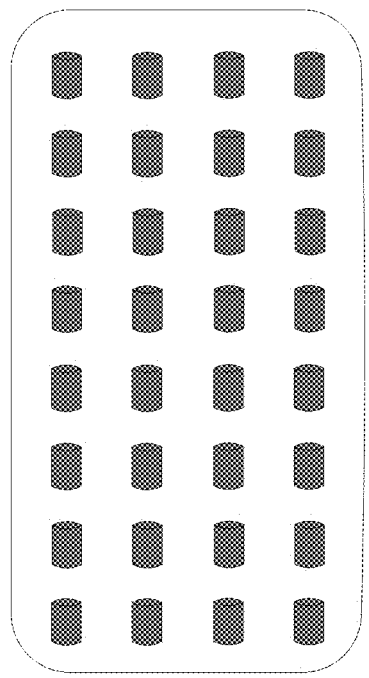
Figure 2D:
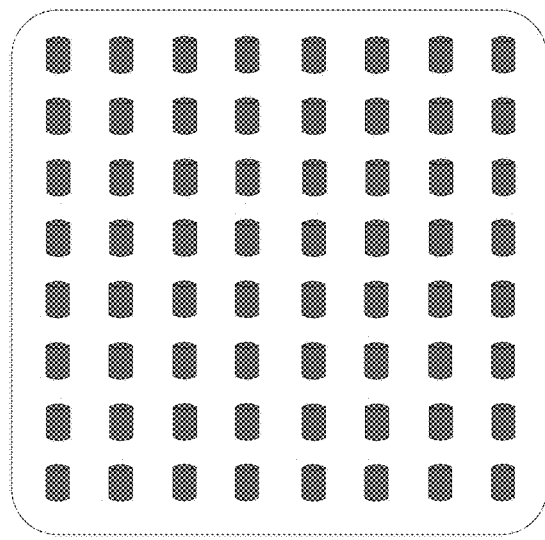
Figure 3:
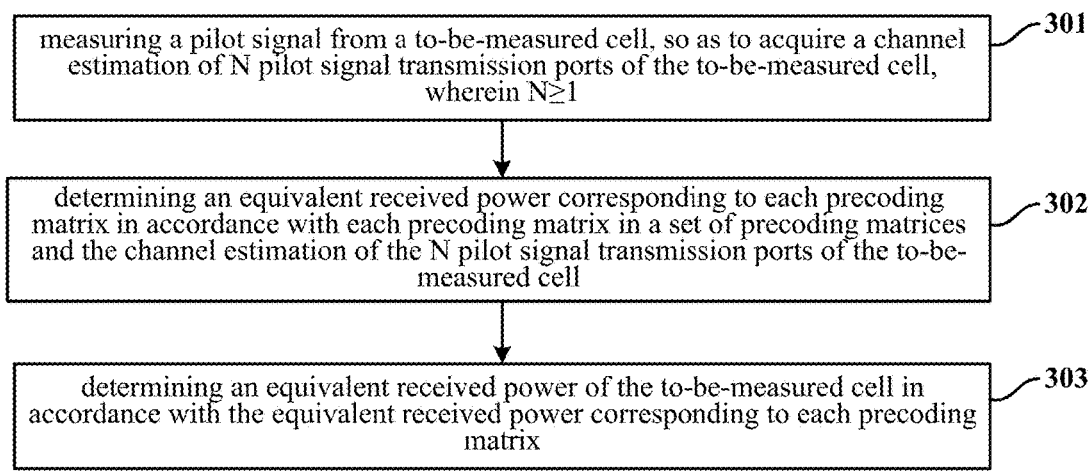
FIG. 3 is a flow chart of a cell measurement method according to one embodiment of the present disclosure.

As shown in FIG. 3, the present disclosure provides in some embodiments a cell measurement method executed by a terminal or a cell selection device inside the terminal. The cell measurement method may include the following steps.

Step 301: measuring a pilot signal from a to-be-measured cell, so as to acquire a channel estimation of N pilot signal transmission ports of the to-be-measured cell, N≥1.

The to-be-measured cell of the terminal may include a serving cell of the terminal and a target handover cell. The target handover cell refers to a cell to which the terminal may be switched, and it may include a cell adjacent to the serving cell of the terminal. The pilot signal may be a CSI-RS or any other kind of pilot signal or reference signal.

The N pilot signal transmission ports may be configured by a base station. To be specific, through configuration by the base station, one terminal may receive the pilot signals from all of the pilot signal transmission ports, or merely from parts of the pilot signal transmission ports. In the case that the terminal is configured by the base station to receive the pilot signals from all of the pilot signal transmission ports, the terminal may perform cell measurement in accordance with the pilot signals from all of the pilot signal transmission ports, so as to acquire a channel estimation of these ports. In the case that the terminal is configured to receive the pilot signals from parts of the pilot signal transmission ports, the terminal may perform the cell measurement in accordance with the pilot signals from parts of the pilot signal transmission ports, so as to acquire the channel estimation of these ports. A channel estimation algorithm will not be particularly defined herein.

Step 302: determining an equivalent received power corresponding to each precoding matrix in accordance with each precoding matrix in a set of precoding matrices and the channel estimation of the N pilot signal transmission ports of the to-be-measured cell.

Figure 4:
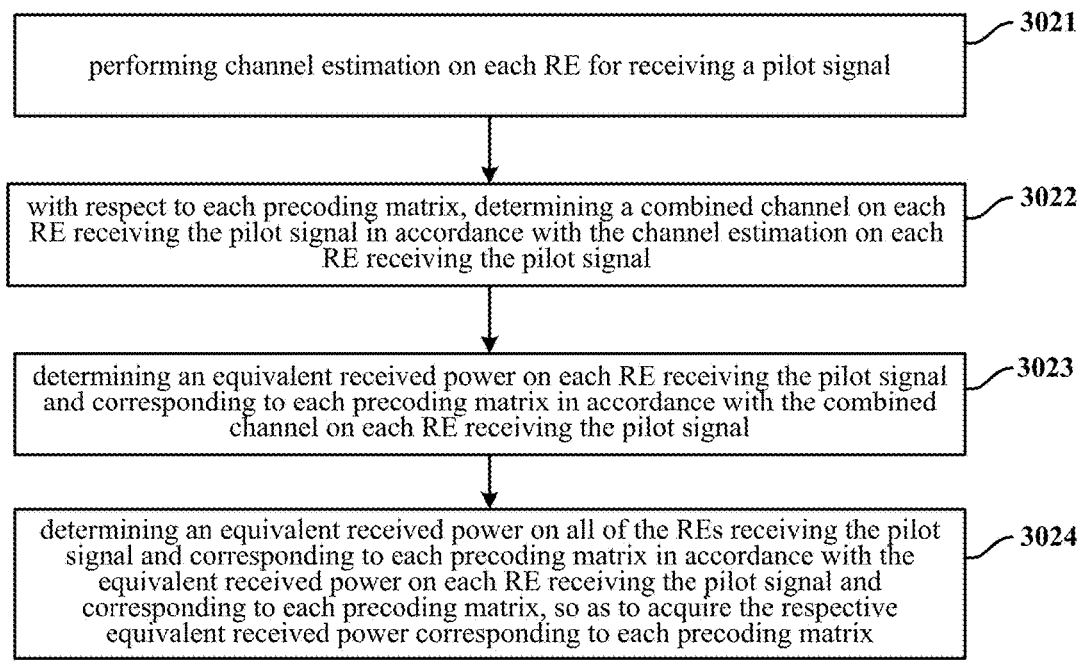
FIG. 4 is a flow chart of Step 302 in FIG. 3.

To be specific, as shown in FIG. 4, Step 302 may include: Step 3021 of performing channel estimation on each Resource Element (RE); Step 3022 of, with respect to each precoding matrix, determining a combined channel on each RE in accordance with the channel estimation on each RE; Step 3023 of determining an equivalent received power on each RE corresponding to each precoding matrix in accordance with the combined channel on each RE; and Step 3024 of determining an equivalent received power on all of the REs corresponding to each precoding matrix in accordance with the equivalent received power on each RE corresponding to each precoding matrix, so as to acquire the respective equivalent received power corresponding to each precoding matrix.

The RE may be a RE for the terminal to receive the pilot signal.

In Step 3022, the combined channel on each RE may be determined through the following formula (1):

$$G_{k,n} = H_k V_n \quad (1),$$

where $V_n$ represents an $n^{th}$ precoding matrix in the set of precoding matrices, $H_k$ represents a channel estimated by the terminal on a $k^{th}$ RE and $H_k$ is a matrix including $N_r$ rows and N columns, $N_r$ represents the number of reception antennae of the terminal, and $G_{k,n}$ represents a combined channel on the $k^{th}$ RE corresponding to $V_n$.

In Step 3023, in the case that a Rank Indicator (RI) is 1, the precoding matrix is a vector and $G_{k,n}$ is a row vector, the equivalent received power on each RE corresponding to each precoding matrix may be determined through the following formula (2):

$$P_{k,n} = \|G_{k,n}\|^2 \quad (2),$$

where $P_{k,n}$ represents the equivalent received power of the terminal on the $k^{th}$ RE with respect to the $n^{th}$ precoding matrix, and $\|A\|$ represents a Frobenius norm of a matrix A.

In Step 3024, the equivalent received power corresponding to each precoding matrix may be determined through the following formula (3):

$$P_n = \text{mean}\{P_{k,n}\}_{k=1,\ldots K} \quad (3),$$

where $P_n$ represents the equivalent received power corresponding to the $n^{th}$ precoding matrix, mean { } represents an averaging operation for acquiring an average value of all of the elements in a set $\{P_{k,n}\}_{k=1,\ldots K}$, and K represents the number of the REs.

Step 303: determining an equivalent received power of the to-be-measured cell in accordance with the equivalent received power corresponding to each precoding matrix.

To be specific, in Step 303, a maximum one of the equivalent received powers corresponding to the precoding matrices may be determined as the equivalent received power of the to-be-measured cell.

For example, the set of REs may consist of all or parts of the REs occupied by CSI-RSs within a certain time period (e.g., 100 ms) and a certain bandwidth range (e.g., 20 MHz). In this regard, the equivalent received power is an average value within the time period and the bandwidth range.

For the to-be-measured cell, the terminal may acquire the maximum one of the equivalent received powers corresponding to all of the precoding matrices, so as to acquire a RSRP estimation value of the to-be-measured cell through the following equation:

$$\text{RSRP} = \max_n P_n \text{ or } \text{RSRP} = a \max_n P_n,$$

where a represents a link gain adjustment value of a receiver and it includes a link gain from a terminal antenna to a baseband processing unit, $\max_n P_n$ represents an operation for acquiring a maximum value of the set $P_n$, elements in the set $P_n$ include RSRPs corresponding to all of the precoding matrices calculated with respect to the to-be-measured cell, and a $\max_n P_n$ represents an operation of multiplying $\max_n P_n$ by a.

In a possible embodiment of the present disclosure, prior to Step 302, the method may further include a step of acquiring a set of precoding matrices. To be specific, the set of precoding matrices may be acquired in, but not limited to, the following modes.

Mode 1: the terminal may receive a dedicated signaling transmitted from the to-be-measured cell, and acquire the set of precoding matrices carried in the dedicated signaling. The to-be-measured cell may be a serving cell of the terminal and/or a target handover cell of the terminal.

Mode 2: the terminal may receive a broadcast message from the to-be-measured cell, and acquire the set of precoding matrices carried in the broadcast message. The to-be-measured cell may be a serving cell of the terminal and/or a target handover cell of the terminal.

Mode 3: the set of precoding matrices may be predefined, e.g., agreed through a protocol. The terminal may acquire the predefined set of precoding matrices.

Further, prior to Step 301 of measuring, by the terminal, the pilot signal from the to-be-measured cell, the method may further include a step of acquiring pilot signal configuration information about the to-be-measured cell. The pilot signal configuration information may at least include at least one of: a pilot signal transmission period, subframe offset, the number of the ports for transmitting the pilot signal, an identifier of the to-be-measured (e.g. a cell ID), or a pilot signal pattern.

The pilot signal configuration information about the to-be-measured cell may be acquired by the terminal in, but not limited to, the following modes.

Mode 1: the terminal may receive a broadcast message from the to-be-measured cell, and acquire the pilot signal configuration information about the to-be-measured cell carried in the broadcast message.

Mode 2: the terminal may receive a dedicated signaling transmitted from the to-be-measured cell, and acquire the pilot signal configuration information about the to-be-measured cell carried in the dedicated signaling.

Mode 3: the terminal may determine the pilot signal configuration information about the to-be-measured cell in an agreed manner.

Further, after determining the equivalent received power of each to-be-measured cell as mentioned above, the terminal may determine the target handover cell or the resident cell in accordance with the determined equivalent received power of each to-be-measured cell. Also, the terminal may transmit the determined equivalent received power of each to-be-measured cell to the serving cell of the terminal or a base station to which the serving cell belongs, so that the serving cell or the base station to which the serving cell belongs may determine the target handover cell or the resident cell of the terminal in accordance with the determined equivalent received power of each to-be-measured cell.

To be specific, the terminal may transmit RSRP values of all possible target cells (including the target handover cells and the current serving cell) to the base station to which the serving cell belongs. Then, the base station to which the serving cell belongs may determine the cell to which the terminal needs to access. In the case that the terminal is in a connected state, the base station to which the serving cell belongs may transmit a cell handover command to the terminal, and an ID of the cell selected for the terminal may be carried in the cell handover command. Alternatively, in the case that the terminal is in the connected state, the base station to which the serving cell belongs may transmit the ID of the selected cell to the terminal, and then the terminal may initiate an access progress so as to be switched to or reside in the cell.

The terminal may also select a to-be-accessed cell in accordance with the RSRP values, i.e., access to a cell with the largest RSRP value. The terminal may acquire the ID of the selected cell in accordance with the IDs of the target cells (including the target handover cells and the current serving cell) carried in the CSI-RS configuration information, and transmit the ID of the selected cell to the base station to which the serving cell belongs. Alternatively, the terminal may voluntarily reside in the selected cell, or initiate an uplink random access progress in the selected cell so as to access to the cell.

As mentioned above, the terminal may determine the equivalent received power corresponding to each precoding matrix in accordance with each precoding matrix in the set of precoding matrices and the channel estimation of the pilot signal transmission ports of the to-be-measured cell, and determine the equivalent received power of the to-be-measured cell in accordance with the equivalent received power corresponding to each precoding matrix, so as to determine the equivalent received power of the to-be-measured cell on the basis of the precoding matrix. The set of the precoding matrices may be set flexibly, so it is able to, based on the feature of the precoding matrix, acquire the equivalent received power of the cell in a more accurate manner, thereby to enable the terminal to select and access to an appropriate cell in the case of cell selection or reselection on the basis of the equivalent received power of the cell.

In a possible embodiment of the present disclosure, the elements in the set of precoding matrices may be Discrete Fourier Transformation (DFT) vectors. Each precoding matrix in the set of precoding matrices may correspond to a spatial direction in a vertical dimension, and the spatial directions in the vertical dimension corresponding to all of the precoding matrices in the set of precoding matrices cover spatial directions of users in the to-be-measured cell in the vertical dimension.

Due to the introduction of the 2D antenna array, the base station may also form a beam in the vertical dimension pointing toward the users at different heights and different vertical angles. However, in order to ensure the coverage of the cell, usually the pilot signal needs to form a directional narrow beam or wide beam in the vertical dimension. In this way, in the case that the cell is measured in accordance with the pilot signal and the cell is selected to be accessed in accordance with the cell measurement result, the terminal may access to an inappropriate cell. This is because, the pilot signal measured by the terminal points towards a fixed direction, but the signal transmitted to the terminal may point toward the terminal, i.e., the two directions may not match with each other. In the embodiments of the present disclosure, each precoding matrix in the set of precoding matrices may correspond to one spatial direction in the vertical dimension, and the spatial directions in the vertical dimension corresponding to all of the precoding matrices in the set of precoding matrices may cover the spatial directions of the users in the to-be-measured cell in the vertical dimension, so the equivalent received power of the cell measured as mentioned above may match with the spatial directions of the terminal and the to-be-measured cell in the vertical dimension in a better manner, and the terminal may select and reside in a more appropriate cell.

Several pilot signal transmission modes are provided in the embodiments of the present disclosure. The modes for transmitting the pilot signal by the base station will be described hereinafter by taking the CSI-RS as an example. Different port combinations for CSI-RS resources may correspond to different cells. For example, 8 ports may be configured for the CSI-RS resources, where port 0 to port 3 may correspond to cell 1, and port 4 to port 7 may correspond to cell 2.

Mode 1

Figure 5A:
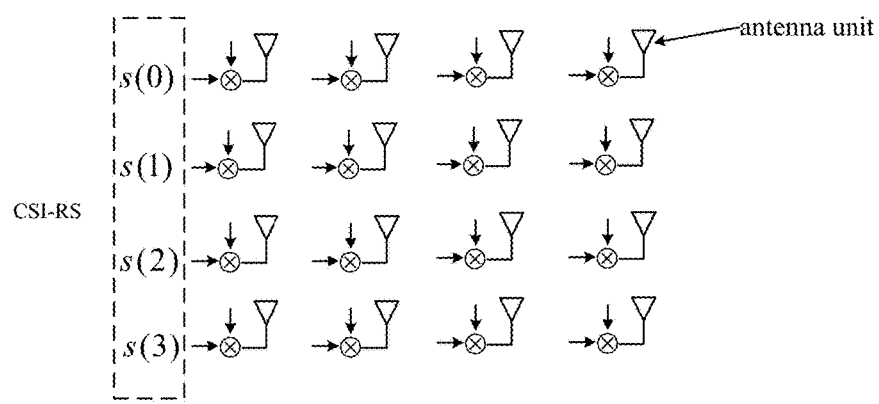
FIGS. 5a-5d are schematic views showing the transmission of a Channel State Information Reference Signal (CSI-RS) according to one embodiment of the present disclosure.

A plurality of ports for the CSI-RS may be mapped to one column of antennae in a 2D antenna array, and the CSI-RS may be transmitted through the one column of antennae. The plurality of ports may include all or parts of the ports for the CSI-RS. FIG. 5a illustratively shows a port configuration for the CSI-RS in the case that the antenna array includes 4*4 antennae. The 4-port CSI-RSs (e.g., s(0), s(1), s(2) and s(3) in FIG. 5a) may be mapped to, and transmitted through, one column of antennae in the antenna array, e.g., a first column of antennae. Each CSI-RS port may be mapped to one antenna unit. The CSI-RS may be transmitted in a wide-beam form in the vertical dimension, and a width of the beam depends on a beam width of a single antenna unit.

Mode 2

Figure 5B:
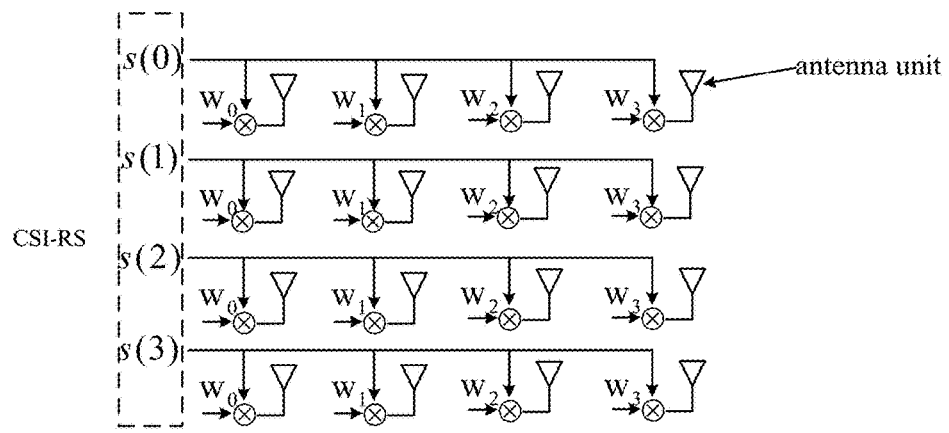

A plurality of ports for the CSI-RS may be mapped to all antenna units of a 2D antenna array, and the CSI-RS may be transmitted through these antenna units. The plurality of ports may be all or parts of the ports for the CSI-RS. FIG. 5b illustratively shows a port configuration for the CSI-RS in the case that the antenna array includes 4*4 antennae. The 4-port CSI-RSs (e.g., s(0), s(1), s(2) and s(3) in FIG. 5b) may be mapped to, and transmitted through, all of the antenna units. Each CSI-RS port may be mapped to one row of antenna units, and $W_i$ represents a beamforming vector corresponding to an $i^{th}$ column of antennae. The pilot signal transmitted through each CSI-RS port may be beamformed and then transmitted through the one row of antennae. A beamforming weight value may be provided in such a manner as to enable the formed beam to cover the entire cell, e.g., to form a broadcasting beam. The CSI-RS may be transmitted in a wide-beam form in the vertical dimension, and a width of the wide beam depends on a beam width of a single antenna unit.

Mode 3

Figure 5C:
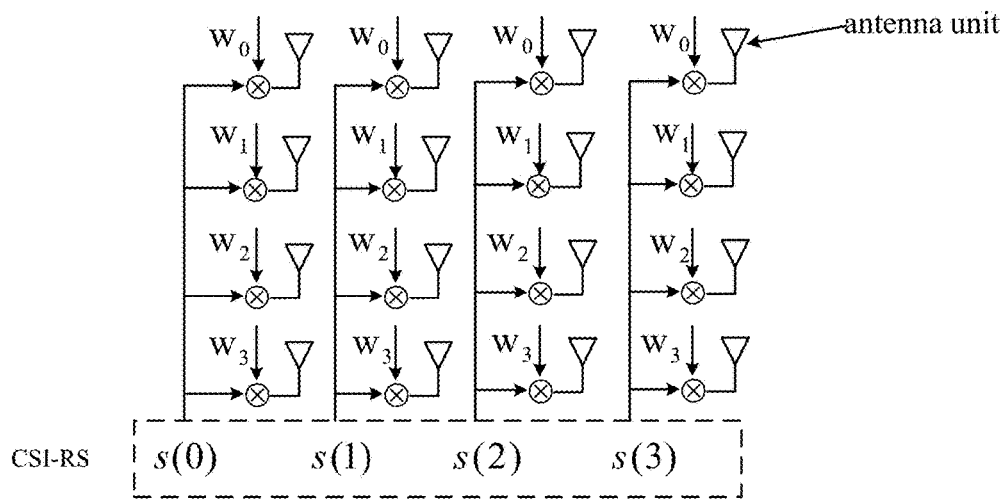

A plurality of ports for the CSI-RS may be mapped to all antenna units of a 2D antenna array, and the CSI-RS may be transmitted through these antenna units. The plurality of ports may be all or parts of the ports for the CSI-RS. FIG. 5c illustratively shows a port configuration for the CSI-RS in the case that the antenna array includes 4*4 antennae. The 4-port CSI-RSs (e.g., s(0), s(1), s(2) and s(3) in FIG. 5c) may be mapped to, and transmitted through, all of the antenna units. Each CSI-RS port may be mapped to one column of antenna units, and $W_i$ represents a beamforming vector corresponding to an $i^{th}$ row of antennae. The pilot signal transmitted through each CSI-RS port may be beamformed and then transmitted through the one column of antennae. A beamforming weight value may be provided in such a manner as to enable the formed beam to cover the entire cell, e.g., to form a broadcasting beam. The CSI-RS may be transmitted in a wide-beam form in the vertical dimension, and a width of the wide beam depends on a beam width of a single antenna unit.

Mode 4

Figure 5D:
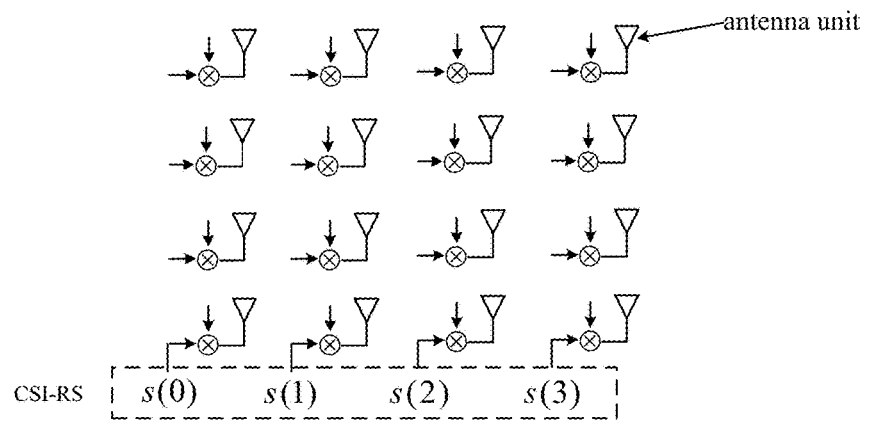

A plurality of ports for the CSI-RS may be mapped to one row of antennae of a 2D antenna array, and the CSI-RS may be transmitted through these antennae. The plurality of ports may be all or parts of the ports for the CSI-RS. FIG. 5d illustratively shows a port configuration for the CSI-RS in the case that the antenna array includes 4*4 antennae. The 4-port CSI-RSs (e.g., s(0), s(1), s(2) and s(3) in FIG. 5d) may be mapped to, and transmitted through, the one row of antennae, e.g., the first row of antennae. Each CSI-RS port may be mapped to one antenna unit. The CSI-RS may be transmitted in a wide-beam form in a horizontal direction, and a width of the wide beam depends on a beam width of a single antenna unit.

Based on an identical inventive concept, the present disclosure further provides in some embodiments a terminal.

Figure 6:
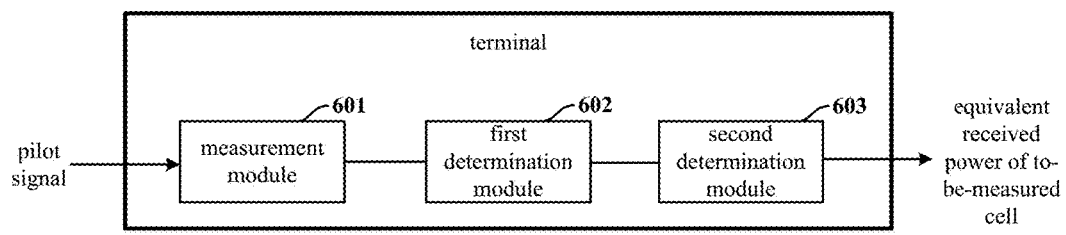
FIG. 6 is a schematic view showing a terminal according to one embodiment of the present disclosure.

As shown in FIG. 6, the present disclosure provides in some embodiments a terminal capable of performing the above-mentioned cell measurement. The terminal may include: a measurement module 601 configured to measure a pilot signal from a to-be-measured cell, so as to acquire a channel estimation of N pilot signal transmission ports of the to-be-measured cell, N≥1; a first determination module 602 configured to determine an equivalent received power corresponding to each precoding matrix in accordance with each precoding matrix in a set of precoding matrices and the channel estimation of the N pilot signal transmission ports of the to-be-measured cell; and a second determination module 603 configured to determine an equivalent received power of the to-be-measured cell in accordance with the equivalent received power corresponding to each precoding matrix.

Further, the measurement module 601 may acquire the set of precoding matrices by: receiving dedicated signaling from the to-be-measured cell and acquiring the set of precoding matrices carried in the dedicated signaling, the to-be-measured cell including a target handover cell and/or a serving cell of the terminal; or receiving a broadcast message from the to-be-measured cell and acquiring the set of precoding matrices carried in the broadcast message, the to-be-measured cell including a target handover cell and/or a serving cell of the terminal; or acquiring a predefined set of precoding matrices.

To be specific, the first determination module 602 may determine the equivalent received power corresponding to each precoding matrix by: performing channel estimation on each RE; with respect to each precoding matrix, determining a combined channel on each RE in accordance with the channel estimation on each RE; determining an equivalent received power on each RE corresponding to each precoding matrix in accordance with the combined channel on each RE; and determining an equivalent received power on all of the REs corresponding to each precoding matrix in accordance with the equivalent received power on each RE corresponding to each precoding matrix, so as to acquire the equivalent received power corresponding to each precoding matrix.

The first determination module 602 may determine the combined channel on each RE through the above-mentioned formula (1), determine the equivalent received power on each RE corresponding to each precoding matrix through the above-mentioned formula (2), and determine the equivalent received power corresponding to each precoding matrix through the above-mentioned formula (3). For details of the formulae (1), (2) and (3) and the parameters thereof, it may refer to those mentioned above, and thus will not be particularly defined herein.

To be specific, the second determination module 603 may determine a maximum one of the equivalent received powers corresponding to the precoding matrices as the equivalent received power of the to-be-measured cell.

Further, the terminal may further include a third determination module or a transmission module (not shown). The transmission module is configured to transmit the determined equivalent received power of the to-be-measured cell to the serving cell of the terminal, so that the serving cell may determine the target handover cell or the resident cell of the terminal in accordance with the equivalent received power of each to-be-measured cell of the terminal. The third determination module is configured to determine the target handover cell or the resident cell in accordance with the determined equivalent received power of each to-be-measured cell.

Further, the first determination module 602 may be further configured to acquire pilot signal configuration information about the to-be-measured cell. The pilot signal configuration information may include at least one of: a pilot signal transmission period, subframe offset, the number of ports for transmitting the pilot signal, an ID of the to-be-measured cell or a pilot signal pattern.

Further, each precoding matrix in the set of precoding matrices may correspond to a spatial direction in a vertical dimension, and the spatial directions in the vertical dimension corresponding to all of the precoding matrices in the set of precoding matrices cover spatial directions of users in the to-be-measured cell in the vertical dimension.

Based on an identical inventive concept, the present disclosure further provides in some embodiments a terminal.

Figure 7:
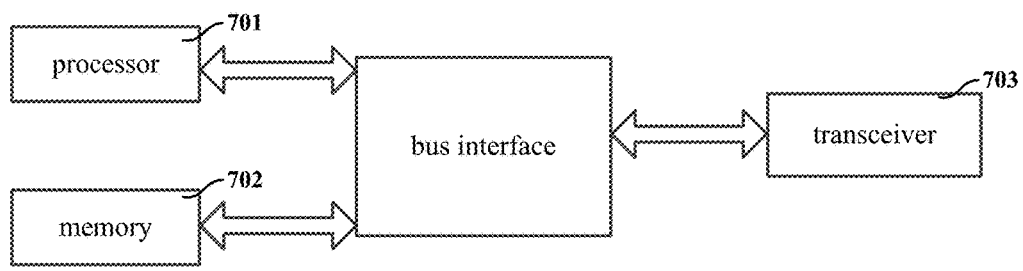
FIG. 7 is another schematic view showing the terminal according to one embodiment of the present disclosure.

As shown in FIG. 7, the present disclosure provides in some embodiments a terminal capable of performing the above-mentioned cell measurement. The terminal may include a processor 701, a memory 702 and a transceiver 703. The processor 701 is configured to read a program stored in the memory 702, so as to: measure a pilot signal from a to-be-measured cell, so as to acquire a channel estimation of N pilot signal transmission ports of the to-be-measured cell, N≥1; determine an equivalent received power corresponding to each precoding matrix in accordance with each precoding matrix in a set of precoding matrices and the channel estimation of the N pilot signal transmission ports of the to-be-measured cell; and determine an equivalent received power of the to-be-measured cell in accordance with the equivalent received power corresponding to each precoding matrix. The transceiver 703 is configured to receive and transmit data under the control of the processor 701.

In FIG. 7, bus architecture may include a number of buses and bridges connected to each other, so as to connect various circuits for one or more processors such as the processor 701 and one or more memories such as the memory 702. In addition, the bus architecture may be used to connect any other circuits, such as a circuit for a peripheral device, a circuit for a voltage stabilizer and a power management circuit, which is known in the art and will not be particularly defined herein. Bus interfaces are provided, and the transceiver 703 may consist of a plurality of elements, i.e., a transmitter and a receiver for communication with any other devices over a transmission medium. The processor 701 may take charge of managing the bus architecture as well as general processings. The memory 702 may store data desired for the operation of the processor 701.

Further, the processor 701 may acquire the set of precoding matrices by: receiving through the transceiver 703 dedicated signaling from the to-be-measured cell and acquiring the set of precoding matrices carried in the dedicated signaling, the to-be-measured cell including a target handover cell and/or a serving cell of the terminal; or receiving through the transceiver 703 a broadcast message from the to-be-measured cell and acquiring the set of precoding matrices carried in the broadcast message, the to-be-measured cell including a target handover cell and/or a serving cell of the terminal; or acquiring a predefined set of precoding matrices.

To be specific, the processor 701 may determine the equivalent received power corresponding to each precoding matrix by: performing channel estimation on each RE; with respect to each precoding matrix, determining a combined channel on each RE in accordance with the channel estimation on each RE; determining an equivalent received power on each RE corresponding to each precoding matrix in accordance with the combined channel on each RE; and determining an equivalent received power on all of the REs corresponding to each precoding matrix in accordance with the equivalent received power on each RE corresponding to each precoding matrix, so as to acquire the respective equivalent received power corresponding to each precoding matrix.

The processor 701 may determine the combined channel on each RE through the above-mentioned formula (1), determine the equivalent received power on each RE corresponding to each precoding matrix through the above-mentioned formula (2), and determine the equivalent received power corresponding to each precoding matrix through the above-mentioned formula (3). For details of the formulae (1), (2) and (3) and the parameters thereof, it may refer to those mentioned above, and thus will not be particularly defined herein.

To be specific, the processor 701 may determine a maximum one of the equivalent received powers corresponding to the precoding matrices as the equivalent received power of the to-be-measured cell.

The processor 701 may further determine the target handover cell or the resident cell in accordance with the determined equivalent received power of each to-be-measured cell, or transmit through the transceiver 703 the determined equivalent received power of the to-be-measured cell to the serving cell of the terminal, so that the serving cell of the terminal may determine the target handover cell or the resident cell of the terminal in accordance with the equivalent received power of each to-be-measured cell of the terminal.

In addition, the processor 701 may further acquire pilot signal configuration information about the to-be-measured cell. The pilot signal configuration information may include at least one of: a pilot signal transmission period, subframe offset, the number of ports for transmitting the pilot signal, an ID of the to-be-measured cell or a pilot signal pattern.

Further, each precoding matrix in the set of precoding matrices may correspond to a respective spatial direction in a vertical dimension, and the spatial directions in the vertical dimension corresponding to all of the precoding matrices in the set of precoding matrices cover spatial directions of users in the to-be-measured cell in the vertical dimension.

According to the embodiments of the present disclosure, the terminal may determine the equivalent received power corresponding to each precoding matrix in accordance with each precoding matrix in the set of precoding matrices and the channel estimation of the pilot signal transmission ports of the to-be-measured cell, and determine the equivalent received power of the to-be-measured cell in accordance with the equivalent received power corresponding to each precoding matrix, so as to determine the equivalent received power of the to-be-measured cell on the basis of the precoding matrix. The set of the precoding matrices may be set flexibly, so it is able to, based on the feature of the precoding matrix, acquire the equivalent received power of the cell in a more accurate manner, thereby to enable the terminal to select and access to an appropriate cell in the case of cell selection or reselection on the basis of the equivalent received power of the cell.

Further, each precoding matrix in the set of precoding matrices may correspond to one respective spatial direction in the vertical dimension, and the spatial directions in the vertical dimension corresponding to all of the precoding matrices in the set of precoding matrices may cover the spatial directions of the users in the to-be-measured cell in the vertical dimension, so the equivalent received power of the cell measured as mentioned above may match with the spatial directions of the terminal and the to-be-measured cell in the vertical dimension in a better manner, and the terminal may select and reside in a more appropriate cell.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the optional embodiments are described above, a person skilled in the art may make modifications and alterations to these embodiments in accordance with the basic concept of the present disclosure. So, the attached claims are intended to include the optional embodiments and all of the modifications and alterations that fall within the scope of the present disclosure.

Obviously, a person skilled in the art may make further modifications and improvements without departing from the spirit of the present disclosure, and these modifications and improvements shall also fall within the scope of the present disclosure.

What is claimed is:

1. A cell measurement method, comprising steps of:
measuring a pilot signal from a to-be-measured cell, to acquire a channel estimation of N pilot signal transmission ports of the to-be-measured cell, wherein $N \geq 1$;
determining an equivalent received power corresponding to each precoding matrix in accordance with each precoding matrix in a set of precoding matrices and the channel estimation of the N pilot signal transmission ports of the to-be-measured cell; and
determining an equivalent received power of the to-be-measured cell in accordance with the equivalent received power corresponding to each precoding matrix,
wherein the step of determining the equivalent received power corresponding to each precoding matrix in accordance with each precoding matrix in the set of precoding matrices and the channel estimation of the N pilot signal transmission ports of the to-be-measured cell comprises:
performing channel estimation on each Resource Element (RE);
with respect to each precoding matrix, determining a combined channel on each RE in accordance with the channel estimation on each RE;
determining an equivalent received power on each RE corresponding to each precoding matrix in accordance with the combined channel on each RE; and
determining a respective equivalent received power on all of the REs corresponding to each precoding matrix in accordance with the equivalent received power on each RE corresponding to each precoding matrix, to acquire the respective equivalent received power corresponding to each precoding matrix,
wherein the step of, with respect to each precoding matrix, determining the combined channel on each RE in accordance with the channel estimation on each RE comprises:
determining the combined channel on each RE through the following formula:

$$G_{k,n} = H_k V_n,$$

where $V_n$ represents an $n^{th}$ precoding matrix in the set of precoding matrices, $H_k$ represents a channel estimated by a terminal on a $k^{th}$ RE, and $H_k$ is a matrix comprises $N_r$ rows and N columns, $N_r$ represents the number of reception antennae of the terminal, and $G_{k,n}$ represents a combined channel on the $k^{th}$ RE corresponding to $V_n$;

the step of determining the equivalent received power on each RE corresponding to each precoding matrix in accordance with the combined channel on each RE comprises:

determining the equivalent received power on each RE corresponding to each precoding matrix through the following formula:

$$P_{k,n} = \|G_{k,n}\|^2,$$

where $P_{k,n}$ represents the equivalent received power of the terminal on the $k^{th}$ RE with respect to the $n^{th}$ precoding matrix, and $\|A\|$ represents a Frobenius norm of a matrix A; and the step of determining the equivalent received power on all of the REs corresponding to each precoding matrix in accordance with the equivalent received power on each RE corresponding to each precoding matrix to acquire the respective equivalent received power corresponding to each precoding matrix comprises:

determining the respective equivalent received power corresponding to each precoding matrix through the following formula:

$$P_n = \mathrm{mean}\{P_{k,n}\}_{k=1,\ldots,K},$$

where $P_n$ represents the equivalent received power corresponding to the $n^{th}$ precoding matrix, mean { } represents an averaging operation for acquiring an average value of all of the elements in the set $\{P_{k,n}\}_{k=1,\ldots,K}$, and K represents the number of the REs.

2. The cell measurement method according to claim 1, wherein prior to the step of determining the equivalent received power corresponding to each precoding matrix in accordance with each precoding matrix in the set of precoding matrices and the channel estimation of the N pilot signal transmission ports of the to-be-measured cell, the cell measurement cell further comprises:

receiving a dedicated signaling transmitted from the to-be-measured cell, and acquiring the set of precoding matrices carried in the dedicated signaling, the to-be-measured cell comprising a target handover cell and/or a serving cell of a terminal; or receiving a broadcast message transmitted from the to-be-measured cell, and acquiring the set of precoding matrices carried in the broadcast message, the to-be-measured cell comprising a target handover cell and/or a serving cell of the terminal; or acquiring a predefined set of precoding matrices.

3. The cell measurement method according to claim 1, wherein the step of determining the equivalent received power of the to-be-measured cell in accordance with the equivalent received power corresponding to each precoding matrix comprises:

determining a maximum one of the equivalent received powers corresponding to the precoding matrices as the equivalent received power of the to-be-measured cell.

4. The cell measurement method according to claim 1, wherein subsequent to the step of determining the equivalent received power of the to-be-measured cell in accordance with the equivalent received power corresponding to each precoding matrix, the cell measurement method further comprises:

transmitting the determined equivalent received power of the to-be-measured cell to a serving cell of a terminal, to enable the serving cell of the terminal to determine the target handover cell or a resident cell of the terminal in accordance with the equivalent received power of each to-be-measured cell of the terminal; or determining the target handover cell or the resident cell in accordance with the determined equivalent received power of each to-be-measured cell.

5. The cell measurement method according to claim 1, wherein prior to the step of measuring the pilot signal from the to-be-measured cell, the cell measurement method further comprises:

acquiring pilot signal configuration information about the to-be-measured cell, wherein the pilot signal configuration information comprises at least one of: a pilot signal transmission period, subframe offset, the number of ports for transmitting the pilot signal, an identity (ID) of the to-be-measured cell, or a pilot signal pattern.

6. The cell measurement method according to claim 5, wherein the step of acquiring the pilot signal configuration information about the to-be-measured cell comprises:

receiving a broadcast message transmitted from the to-be-measured cell, and acquiring the pilot signal configuration information about the to-be-measured cell carried in the broadcast message; or receiving a dedicated signaling transmitted from the to-be-measured cell, and acquiring the pilot signal configuration information about the to-be-measured cell carried in the dedicated signaling; or determining the pilot signal configuration information about the to-be-measured cell in a predetermined manner.

7. The cell measurement method according to claim 1, wherein each precoding matrix in the set of precoding matrices corresponds to a respective spatial direction in a vertical dimension, and the spatial directions in the vertical dimension corresponding to all of the precoding matrices in the set of precoding matrices cover spatial directions of users in the to-be-measured cell in the vertical dimension.

8. The cell measurement method according to claim 1, wherein each precoding matrix in the set of precoding matrices corresponds to a respective spatial direction in a vertical dimension, and the spatial directions in the vertical dimension corresponding to all of the precoding matrices in the set of precoding matrices cover spatial directions of users in the to-be-measured cell in the vertical dimension.

9. A terminal, comprising: a processor, a memory and a transceiver, wherein the processor is configured to read a program stored in the memory to:

measure a pilot signal from a to-be-measured cell, to acquire a channel estimation of N pilot signal transmission ports of the to-be-measured cell, wherein $N \geq 1$;

determine an equivalent received power corresponding to each precoding matrix in accordance with each precoding matrix in a set of precoding matrices and the channel estimation of the N pilot signal transmission ports of the to-be-measured cell; and determine an equivalent received power of the to-be-measured cell in accordance with the equivalent received power corresponding to each precoding matrix, the transceiver is configured to receive and transmit data, and the processor takes charge of managing bus architecture and general processings, and the memory is configured to store therein data for the operation of the processor, wherein the processor is further configured to:

perform channel estimation on each Resource Element (RE);

with respect to each precoding matrix, determine a combined channel on each RE in accordance with the channel estimation on each RE;

determine an equivalent received power on each RE corresponding to each precoding matrix in accordance with the combined channel on each RE; and determine a respective equivalent received power on all of the REs corresponding to each precoding matrix in accordance with the equivalent received power on each RE corresponding to each precoding matrix, to acquire the respective equivalent received power corresponding to each precoding matrix, wherein the processor is further configured to:

determine the combined channel on each RE through the following formula:

$$G_{k,n}=H_k V_n,$$

where $V_n$ represents an $n^{th}$ precoding matrix in the set of precoding matrices, $H_k$ represents a channel estimated by the terminal on a $k^{th}$ RE, and $H_k$ is a matrix comprises $N_r$ rows and N columns, $N_r$ represents the number of reception antennae of the terminal, and $G_{k,n}$ represents a combined channel on the $k^{th}$ RE corresponding to $V_n$;

determine the equivalent received power on each RE corresponding to each precoding matrix through the following formula:

$$P_{k,n}=\|G_{k,n}\|^2,$$

where $P_{k,n}$ represents the equivalent received power of the terminal on the $k^{th}$ RE with respect to the $n^{th}$ precoding matrix, and $\|A\|$ represents a Frobenius norm of a matrix A; and determine the respective equivalent received power corresponding to each precoding matrix through the following formula:

$$P_n=\text{mean}\{P_{k,n}\}_{k=1,\ldots K},$$

where $P_n$ represents the equivalent received power corresponding to the $n^{th}$ precoding matrix, mean { } represents an averaging operation for acquiring an average value of all of the elements in the set $\{P_{k,n}\}_{k=1,\ldots K}$, and K represents the number of the REs.

10. The terminal according to claim 9, wherein the processor is further configured to:

receive a dedicated signaling transmitted from the to-be-measured cell, and acquire the set of precoding matrices carried in the dedicated signaling, the to-be-measured cell comprising a target handover cell and/or a serving cell of the terminal; or receive a broadcast message transmitted from the to-be-measured cell, and acquire the set of precoding matrices carried in the broadcast message, the to-be-measured cell comprising a target handover cell and/or a serving cell of the terminal; or acquire a predefined set of precoding matrices.

11. The terminal according to claim 9, wherein the processor is further configured to:

determine a maximum one of the equivalent received powers corresponding to the precoding matrices as the equivalent received power of the to-be-measured cell.

12. The terminal according to claim 9, wherein the processor is further configured to:

transmit the determined equivalent received power of the to-be-measured cell to a serving cell of the terminal, to enable the serving cell of the terminal to determine the target handover cell or a resident cell of the terminal in accordance with the equivalent received power of each to-be-measured cell of the terminal; or determine the target handover cell or the resident cell in accordance with the determined equivalent received power of each to-be-measured cell.

13. The terminal according to claim 9, wherein the processor is further configured to:

acquire pilot signal configuration information about the to-be-measured cell, and the pilot signal configuration information comprises at least one of: a pilot signal transmission period, subframe offset, the number of ports for transmitting the pilot signal, an ID of the to-be-measured cell, or a pilot signal pattern.

14. The terminal according to claim 9, wherein each precoding matrix in the set of precoding matrices corresponds to a respective spatial direction in a vertical dimension, and the spatial directions in the vertical dimension corresponding to all of the precoding matrices in the set of precoding matrices cover spatial directions of users in the to-be-measured cell in the vertical dimension.

15. The terminal according to claim 9, wherein each precoding matrix in the set of precoding matrices corresponds to a respective spatial direction in a vertical dimension, and the spatial directions in the vertical dimension corresponding to all of the precoding matrices in the set of precoding matrices cover spatial directions of users in the to-be-measured cell in the vertical dimension.

* * * * *